United States Patent
Zickell et al.

(10) Patent No.: US 8,672,248 B2
(45) Date of Patent: Mar. 18, 2014

(54) ASPHALT MATERIAL RECYCLING SYSTEM AND METHOD WITH BALL SCREENER AND IMPACT AND CUTTING CHOPPERS

(75) Inventors: Robert Zickell, Winchester, MA (US); Thomas J. Zickell, New Castle, NH (US)

(73) Assignee: Recycled Asphalt Shingle Technology, LLC, Brentwood, NH (US)

( * ) Notice: Subject to any disclaimer, the term of this patent is extended or adjusted under 35 U.S.C. 154(b) by 0 days.

(21) Appl. No.: 13/495,477

(22) Filed: Jun. 13, 2012

(65) Prior Publication Data

US 2013/0008986 A1    Jan. 10, 2013

Related U.S. Application Data (63) Continuation of application No. 12/845,179, filed on Jul. 28, 2010, now Pat. No. 8,496,196.

(60) Provisional application No. 61/230,426, filed on Jul. 31, 2009.

(51) Int. Cl.
*B02C 19/00* (2006.01)

(52) U.S. Cl.
USPC .............. 241/65; 241/79; 241/80; 241/152.2

(58) Field of Classification Search
USPC ............. 241/14, 23, 80, 79, 65, 189.1, 152.2; 209/3

See application file for complete search history.

(56) References Cited

U.S. PATENT DOCUMENTS

| | | | | |
|---|---|---|---|---|
| 4,025,990 | A | * | 5/1977 | Lovette, Jr. ..................... 241/14 |
| 5,337,901 | A | * | 8/1994 | Skaer ............................ 209/315 |
| 2011/0049275 | A1 | * | 3/2011 | Zickell et al. .............. 241/24.12 |

* cited by examiner

*Primary Examiner* — Mark Rosenbaum
(74) *Attorney, Agent, or Firm* — Bourque and Associates, PA (57) ABSTRACT

An asphalt roofing material recycling system and method is used to recycle new and used asphalt materials. The asphalt material is broken up and separated. Dry ice may be added to the recycler and/or a jacket coolant used to cool the recycling vessel. The recycle vessel includes a number of high speed choppers having a blunt end as well as a horizontal mixer element with paddles. The recycled asphalt material is provided to a screener that may feature a plurality of sloping levels, each level including a tray below a screen and balls located within the tray that bounce due to vibration to prevent clogging of the screener. A second processing trip involving gravity feeding the material to be further recycled into a cutter with knife edges to further break down the size of the asphalt material is used for large particles that do not pass through the screener.

12 Claims, 8 Drawing Sheets

ASPHALT MATERIAL RECYCLING SYSTEM AND METHOD WITH BALL SCREENER AND IMPACT AND CUTTING CHOPPERS

CROSS-REFERENCE TO RELATED APPLICATIONS

This application claims priority to U.S. patent application Ser. No. 12/845,179 filed on Jul. 28, 2010 entitled "Asphalt Material Recycling System And Method" and Provisional Patent Application No. 61/230,426 filed on Jul. 31, 2009 entitled "Asphalt Material Recycling System and Method" both of which are incorporated fully herein by reference.

FIELD OF THE INVENTION

This invention relates to a recycling system and method and in particular, to a system and method of recycling granular and non-granular coated asphalt material such as new and used roofing shingles utilizing impact and cutting choppers as well as a ball screener for screening processed product.

BACKGROUND OF THE INVENTION

Roofing shingles are traditionally manufactured utilizing asphalt, which is derived from crude oil. Asphalt prices have recently increased even more rapidly than crude oil prices. In addition to the use and cost of crude oil in the asphalt manufacturing process, the process of manufacturing asphalt shingles further utilizes a considerable amount of fossil fuels heating both the asphalt and the fillers so that they can be combined. Typically, approximately 65% filler is mixed with approximately 35% asphalt. In order to create a mixture having a usable viscosity, the asphalt is heated to 450° F. while the filler is heated to approximately 350° F. prior to the two additives being mixed together.

Considerable waste is involved with the manufacture and use of asphalt roofing materials, such as shingles and roll roofing membranes. For example, each new asphalt roofing shingle has cutout tabs that are removed and discarded (this waste will be called "manufacturer's asphalt roofing shingle waste") while old shingle materials removed from existing buildings (this waste will be called "post consumer asphalt shingle waste") also adds to a significant amount of roofing material waste. In the US alone, 11 million tons of post consumer asphalt shingles are removed from roofs annually. Approximately 10 million of these tons are buried in landfills. Not only are landfill costs increasing, but access to landfills for recyclable products is becoming more restricted since roofing shingles are products which do not degrade. Asphalt shingles pose an additional particular problem to landfills because they restrict natural water movement causing delays with the natural decay of other items in the landfill. The asphalt shingles themselves do not degrade and stay permanently in the landfill.

Recycling of all types of roofing material waste has been discussed and attempted but has not been terribly successful. The waste generated from asphalt roofing materials presents a significant recycling as well as environmental concern because of the composition of the roofing material. Typical shingles are composed of a cellulose fiber saturated with asphalt or fiberglass mat, an asphalt coating on the mat, and granules disposed on the coating. Such materials are difficult to break down and have typically required complex recycling processes.

Past attempts at recycling asphalt shingles have failed to free up the asphalt into a usable form so that it can be successfully incorporated into commonly used asphalt based products, such as roof shingles and road pavement. If the granules in the recycled shingle material are not reduced to a fine powder, the granules will not remain suspended in an asphalt solution and the recycled shingle material cannot be reused in roofing or other products. Too fine of a granule also poses a problem in that the fine material does not have a significant use and is therefore not sellable.

In typical asphalt shingle construction, 42 percent of the weight is surfacing granules. The granules are usually made of trap rock which is colored by ceramic type process. The typical mesh size runs from 2 percent being retained on a 10 mesh screen to 2 percent retained on a 40 mesh screen. The sand backing accounts for 5 percent of the weight with the mesh running 2 percent retained on a 50 mesh and the rest smaller down to 25 to 35 mesh. The limestone filler runs from 2 percent retained on a 70 mesh to finer. Consequently, the hard minerals can be removed by passing the material through a screen having a mesh size between 35-50 mesh. The preferred mesh size is 36-38 mesh. If the granule or sand particles are broken, they could pass into the filled coating powder causing glass mat weakening related problems. 49 percent of the shingle weight is filler and asphalt or "filled coating". The asphalt and filler are inseparable in this process with each particle of limestone completely coated with asphalt. The coarsest filler particles have 2 percent retained on a 70 mesh screen, but even though they are coated with asphalt they easily pass through 30-50 mesh screens. 5 percent of the shingle is sand. These sand particles fall within the limestone filler. While sand is a hard particle this small amount can be tolerated or removed using air separation, thereby exploiting the density difference between filled coating and sand. 2 percent of the shingle composition is the aforementioned glass mat. After processing, the fiber remains bound up with the asphalt/filler portion of the mix in the form of a "flake" and is screened out using a ¼ mesh screen. The remaining 2 percent consists of adhesives used to bond the shingles together.

Some past methods of recycling asphalt roofing material have used milling machines, such as rolling mills, bag mills, hammer mills, saw mills, etc. to produce a recycled roofing material which can be used only in road construction or as other similar "filler" material. However, merely milling the shingle material in a reduction mill without further processing has been unsuccessful in reducing the granules in the shingle material to a fine mesh so that the recycled asphalt can be reused in manufacturing new roofing products.

Asphalt roads are comprised of six percent paving grade asphalt and ninety-four percent aggregate. The particle size distribution is very specific and is carefully monitored by state and federal agencies. Prior attempts to use post factory and post consumer shingles have been stopped by four major issues. First, ⅜ inch chips (the standard currently in use) will not dissolve in the mixing process, so little asphalt is freed up for incorporation into the road (the entrained mix energy is lost) which causes the amount of asphalt and mineral to be inconsistent. Second, the plastic mylar on the back of all shingles is left as 4-5 inch by 1 inch pieces. Third, the nails may not be removed and fourth, the shingles contain too many fines. All of these issues create their own series of problems in recycling the materials for reuse in road asphalt blends. Nails cannot be present in the recycled material that is to be used, as nails in a road would pose serious problem. Likewise, the presence of fines in pavement asphalt creates air pockets and voids that affect the HMA performance in terms of rutting and cracking. Shingles contain 30-40 percent fines and the amount of fines needs to be reduced as low as possible because the fines increase viscosity causing more roller energy to be required (more passes over the pavement while hot) and they can have serious road quality implications. A new process is needed that resolves all of these issues.

One apparatus for recycling roofing shingles is disclosed in U.S. Pat. No. 4,706,893 to Brock. This apparatus includes a hammer mill that comminutes the shingles and a vessel that subsequently dries then mixes the recycled shingle material with liquid asphalt, for recycling as an asphalt paving composition. This milling process will not reduce the granules in the shingle material to a small enough size for the shingle material to be reused in applications other than an asphalt paving composition. Portions of the recycled material that are too fine are considered "fines". Paving mix can only contain 2 percent fines or it becomes excessively viscous. This means that when it is pressed with a roller excessive voids may be created because compacting is difficult. Voids are mechanically weak areas, and they can cause premature failure due to having too much surface area exposed to oxygen. Asphalt becomes brittle with age due mostly to oxygenation. A ⅜ inch shingle chip or any combination of the full ingredients of a shingle contains 34 percent fines.

Another shingle reducing apparatus is disclosed in U.S. Pat. No. 5,385,426 to Omann. This complex apparatus includes a shredder, two hammer mills, and two heated vessels for drying the shingle material after it has been reduced. This apparatus further requires spraying the shingles with water prior to entering the first hammer mill in order to prevent sticking. The addition of water is a big problem in roofing manufacturing operations because vaporization increases water volume by 1600 percent, which can cause potential tank over flows and other unsafe conditions when mixed with hot asphalt. This extremely complex and involved process requiring two hammer mills also is not capable of completely reducing the granules in the recycled shingle material to a fine mesh or powder.

One reason milling machines have been unsuccessful in reducing the size of the granules in the recycled shingle material is because the shingle material was not heated as it was milled. In the past, heating the milling machine as the shingle material is milled was considered hazardous because of pressure build up in the closed milling vessel or heating vessel as a result of moisture in the shingle material. Heating would also make hammer mills gum up and not work because the asphalt would become sticky.

The typical recycling operation involves passing the material through a hammer mill to create ⅜ inch chips. Hammer mills function by revolving a pivot arm at a high speed and impinging the material between a plate and the hammer on the end of a pivot arm. The material is constrained in a chamber by a screen with holes of the desire output size. The impingement created breaks some of the surfacing granules into a fine powder and leaves the rest of the material in pieces the size of the screen holes (usually ⅜ inches). The only use for this material is in Hot Mix Asphalt for roads. This material cannot be used for asphalt roofing products because any hard minerals such as the surfacing granules or the sand used on the underside of the shingles (to prevent sticking in the bundles) cannot be used. Shingles are made by saturating and coating a fiberglass mat (13-15 mm diameter fibers, 1 to 1.5 inches long glued at fiber cross over junctions with a binder with a typical weight of 1.7 pounds per 100 square feet) with 65 percent limestone (a soft mineral) filler and 35 percent oxidized asphalt. This mixture is called "filled coating". The surface is then covered with granules and the underside covered with sand. The hard minerals, granules and sand, cannot be present in quantity in the filler/asphalt mix because the coating process is roll over roll with the fiberglass mat passing through a nip. If excessive hard minerals are present, the pressure created within the nip causes breakage or abrading of the glass fibers. After exposure on the roof, the shingles would tear due to the weakened reinforcement. This problem caused widespread roof failures in the industry. At that time, rock dust was sometimes used as filler, so the same problem would occur if hard granules or sand were allowed into any fiberglass mat based roofing product.

Accordingly, what is needed is an asphalt shingle recycling system and method that is able to adequately process both new and post-consumer asphalt shingles into material of usable type and size as well as a material sorter which is able to sort the processed material into material of different sizes or grades for either more processing or for use in one or more applications. The process must remove all the offending hard minerals while capturing the filled coating.

SUMMARY OF THE INVENTION

Accordingly, the present invention provides an asphalt material recycling apparatus and method that is capable of recycling asphalt shingle material, cellulose fibers, fiberglass fibers and other particles in the asphalt shingle material to a course to fine mesh powder that can be either used along with liquid asphalt or used in a dry form for various purposes.

The preferred method of recycling asphalt material includes cryogenically milling the asphalt material in an apparatus that can be sufficiently cooled such that the asphalt material to be recycled is essentially chipped, shredded and broken down into fine particles for further use in various processes such as the manufacture of asphalt shingles or roadway asphalt mixture. As asphalt cools it becomes less adhesive and more brittle. Consequently, cooling assists the impacting process. Cooling can be accomplished by jacketing the vessel or adding dry ice, liquid $CO_2$, or liquid Nitrogen. The preferred method is to add dry ice because the phase change from a solid to a liquid (sublimation) absorbs heat and dissipates moisture. Therefore, the material is cooled and dried simultaneously.

Cryogenic processing can be accomplished using any of the previously mentioned media containing mills. The media mill, however, crushes the granules and the sand. In this preferred embodiment, the material is impacted without a mechanical impingement at a speed of 3000 RPMS, a speed that will not break the granules or sand into smaller particles. This action breaks the filled coating away from the reinforcing layer and from the granules so that each component may be used separately. The process creates a material that can be easily processed by the hot mix asphalt producers.

Either the mill is cooled or the material is cooled before entering the mill or while in the mill. Cold grinding is preferred even though the mechanical energy used to grind becomes heat, which must be overcome with cooling energy. The paving industry requires a coarser grind than roofing materials because the fine particles interfere with the compaction process. This is due to the increase in asphalt viscosity that occurs with the introduction of particles of 200 mesh or finer. The cold grinding process lends itself to a coarser grind because the process can be stopped and the material tested very rapidly using screens to ascertain the particle size distribution. Hot asphalt testing requires a lengthy process of removing the asphalt with solvents, drying the remaining particles and then screening. Typically, this would take longer than the grinding cycle. The cold grind process produces a powder (almost like gun or black powder) that can be easily stored outside and conveyed into the paving process without modifying the typical paving plant equipment. This convenience is important to the marketability of the product. If a hot liquid was made from the shingles, the sand and granules could be tolerated, but the hot mix asphalt plants cannot deal with a mixture of solids and asphalt because they do not have storage tanks that have agitation.

In one embodiment, the system for asphalt recycling comprises an asphalt material recycler, configured for receiving asphalt material to be recycled, said asphalt material recycler having a recycling chamber, at least one motor and one or more choppers, coupled to said at least one motor and located in said recycling chamber, said one or more choppers impacting said asphalt material to be recycled without mechanical impingement such that granules are removed from said asphalt material and not broken, wherein said asphalt material recycler includes one or more of the following cooling processes selected from the group of cooling processes consisting of: dry ice, a jacket coolant and liquid nitrogen.

The system also includes a vibrating screener, coupled to said asphalt material recycler and configured for receiving recycled asphalt material from said recycling chamber, said screener including a tray located below a mesh surface, said tray configured to hold a plurality of balls, wherein said balls are configured to bounce at least partially upwardly against each said respective mesh surface when said vibrating screener vibrates during operation. The vibrating screener preferably allows for separation of asphalt at 30-60 mesh.

In another embodiment, the screener may include a plurality of screen levels, wherein each of said plurality of screen levels includes a mesh surface. Each of the mesh surfaces has a mesh size which differs from a mesh size of at least one other of said plurality of screen levels, each screen level arranged in a sloping configuration from back to front.

The screener may include an uppermost level with an uppermost level screen and wherein all asphalt material to be recycled that does not pass through said uppermost level screen of said uppermost level exits said screener and is sent to and re-enters said asphalt material recycler.

The system may further include a hopper, configured for receiving asphalt material to be recycled, said hopper coupled to a material conditioner, wherein the material conditioner is located between said hopper and said asphalt material recycler, wherein said material conditioner includes a belt with one or more teeth configured to tear apart and separate said asphalt material to be recycled and one or more hooks configured to force said asphalt material to be recycled through said teeth.

In another embodiment, a fine powder may be added to said asphalt material recycler, wherein said fine powder is selected from the group consisting of talc and limestone, wherein said fine powder is pressured into said asphalt material by said choppers.

The cooling processes may include dry ice and wherein said dry ice is broken down by said choppers, wherein sublimation of said dry ice both cools and dries the asphalt material within the recycler.

The one or more choppers each include a motor that operates one or more blunt hammer style chopper heads or knives that serve to break up the asphalt material within the recycling chamber.

The system may further comprise a sorting belt, coupled to the material conditioner, wherein the sorting belt allows for human or mechanical removal of unwanted debris from the asphalt material to be recycled prior to the asphalt material being inserted into the recycler.

The asphalt material to be recycled may be selected from the group consisting of roofing shingle, tar paper, roll roofing, modified roll roofing, built up roofing and other granular or non-granular asphalt coated material.

An asphalt output material of the sorter is configured to be used in new asphalt products such as roofing shingles, self-adhesive underlayment membranes or asphalt paving compositions.

The invention also includes a method of recycling asphalt material comprising the acts of placing asphalt material to be recycled into a hopper; providing the asphalt material to be recycled to a recycler, coupled to said hopper, said recycler including a recycling chamber, one or more motors, one or more high-speed choppers; cooling said recycling chamber; and providing the recycled asphalt material from the recycling chamber to a vibrating screener having a screen having a mesh size, a tray located below said screen, said tray having a plurality of balls located within the tray, and wherein the screener outputs a coarse to fine mesh recycled asphalt material.

The screener of the method may comprise a plurality of levels, wherein each of said plurality of levels includes a screen having a mesh size that differs from at least one other mesh size screen of another level, a tray located below each screen, each said tray said and a plurality of balls located within the screen, and wherein the screener outputs a coarse to fine mesh recycled asphalt material through a plurality of discharge chutes, each of said discharge chutes containing a different separation of material. The screener may allow for separation at 30-60 mesh.

The screener may include an uppermost level with a screen and wherein all asphalt material to be recycled that does not pass through said screen of said uppermost level exits said screener and re-enters said asphalt material recycler. In one embodiment, prior to said re-entry into said asphalt material recycler, said method includes gravity feeding said asphalt material to be recycled through a cutter or knife chopper, wherein said cutter or knife chopper is contained within a box or pipe.

The method may further comprise the act of passing said asphalt material to be recycled through a primary size reducing unit, prior to said asphalt material to be recycled entering said recycler, said primary size reducing unit comprising a rotating drum with a surface, wherein said surface include a plurality of teeth, wherein said asphalt material to be recycled is passed by said plurality of teeth to a screen.

One or more high-speed choppers may each include a motor that operates one or more paddles that serve to breakup the asphalt material within the recycling chamber. The method may also include using air separation to remove sand and granules after said asphalt material to be recycled has passed through said sorter.

The asphalt material may be selected from the group consisting of roofing shingles, tar paper, roll roofing, modified roll roofing, built up roofing and other granular or non-granular asphalt containing material, and wherein the coarse to fine mesh asphalt material is usable in the creation of asphalt products such as roofing shingles, self-adhesive underlayment membranes or asphalt paving compositions.

The cooling device utilized in the method may include one or more of the following: dry ice, a jacket coolant or liquid nitrogen.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
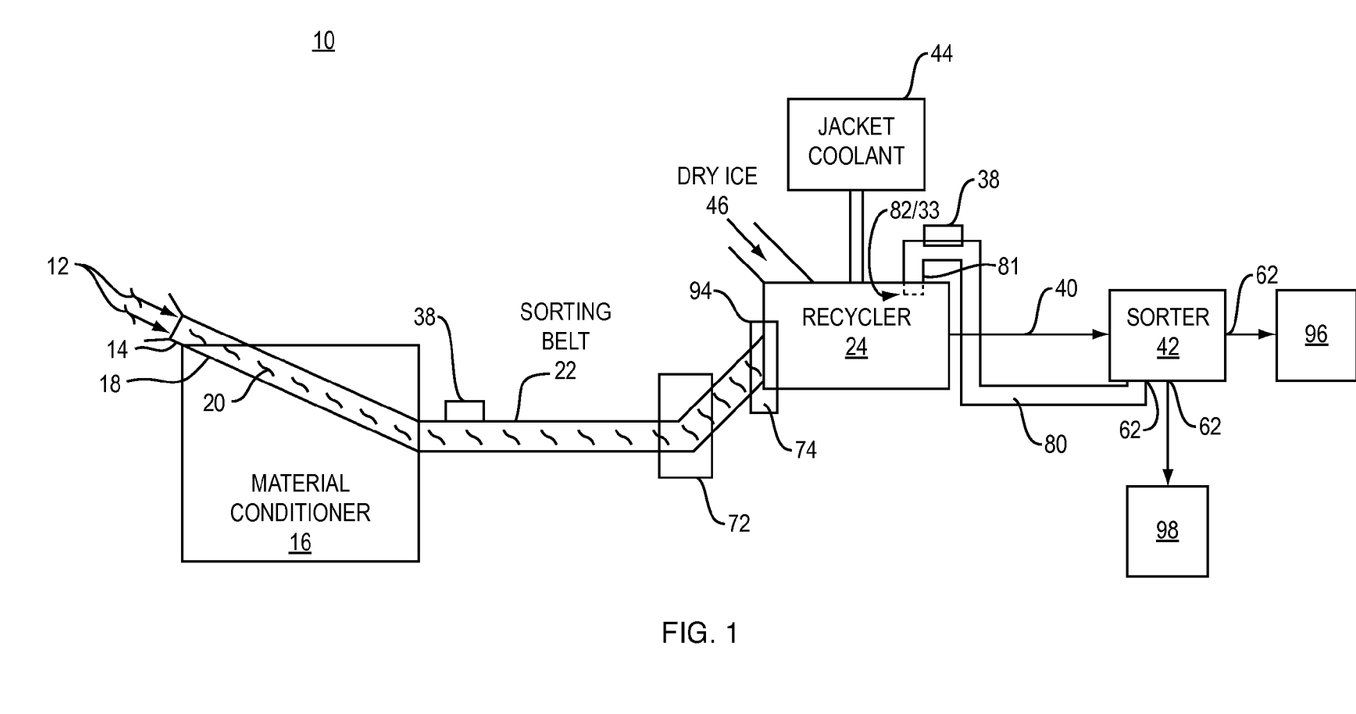
FIG. 1 is a schematic block diagram of an asphalt material recycling system and method according to the present invention.

An asphalt material recycling system and method 10, FIG. 1, according to the present invention is used to recycle asphalt material, such as new and post consumer asphalt (organic and fiberglass based) roof shingles, tar paper, roll roofing, built up roofing and other similar granular or non-granular asphalt coated materials. The granules, fibers or other particles are reduced to a course to fine mesh that can be stored and then reused in the manufacture of new asphalt roofing products, asphalt paving compositions, and other applications.

According to one embodiment of the asphalt material recycling system method of the present invention, an exemplary system 10, FIG. 1 is shown. In this figure, asphalt based products 12, such as manufacturer's asphalt roofing shingle waste and post consumer asphalt shingle waste, are provided into a hopper 14. The hopper 14 may be attached to a material conditioner 16. The material conditioner 16 is designed with a belt 18 having a number of teeth 20, which serve to tear apart, remove wrappers and separate any bundles or otherwise compacted shingle waste material of either type. The teeth 20 may exist on the belt 18 itself and/or may be suspended over and/or along the side of the belt 18. The material conditioner may also feature one or more hooks 17, located on the belt 18, which force the asphalt based products 12 through the teeth 20. Breaking apart the asphalt based product 12 is important for further recycling, however, the use of a material conditioner 16 may be optional in some systems.

Figure 7:
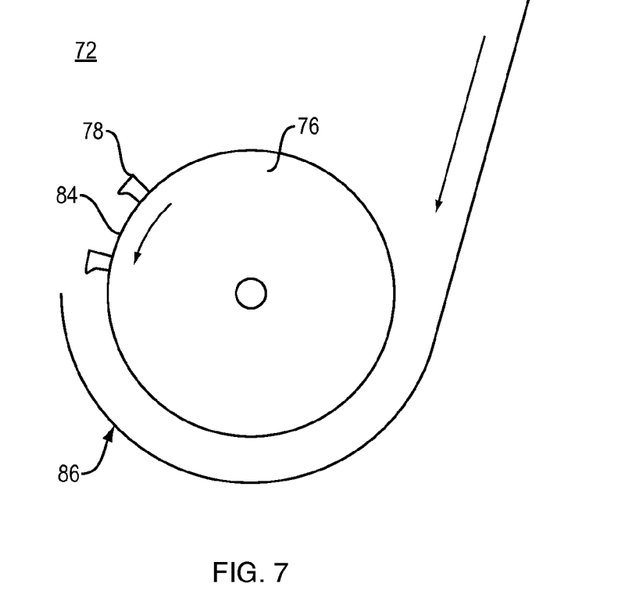
FIG. 7 is a detailed view of a primary size reduction unit according to one embodiment of the present invention.

After separation by the material conditioner 16, a primary size reducing unit 72, FIG. 7, is used to break the asphalt based product 12 down to preferable 2-4 inch pieces. The primary size reducing unit 72 has a large rotating drum 76 with a plurality of hardened teeth 78 protruding from a surface 84 of the rotating drum 76. Asphalt based products 12 are conveyed into the top (shown by downward arrow) of the primary size reducing unit 72 and are trapped between a screen 86 with 2-4 inch holes and the rotating drum 76. There is no impingement to break the granules between the teeth 78 and a breaker bar or plate that is typical of hammer mills. In a preferred embodiment of the present invention, the drum 76 rotates at approximately 800 RPM's.

The asphalt based product 12 to be processed exits the material conditioner 16 (if present) on a sorting belt 22. This stage optionally allows human or mechanical means for removing unwanted debris such as nails, wood, metal or the like. The separation may be done by a magnet 38 or by hand using one or more individuals sorting the material. The sorting belt 22 may also feature a plurality of teeth 20 on the belt 22 itself and/or suspended over and/or along the side of the belt 22. As presently contemplated, the recycling system will be operated in batch mode and thus, a predetermined amount of asphalt based product 12 will be provided to the material conditioner 16 and passed over sorting belt 22 and sorted. However, it is also contemplated and within the scope of the present invention that the system 10 can be run in a continuous mode.

Figure 8:
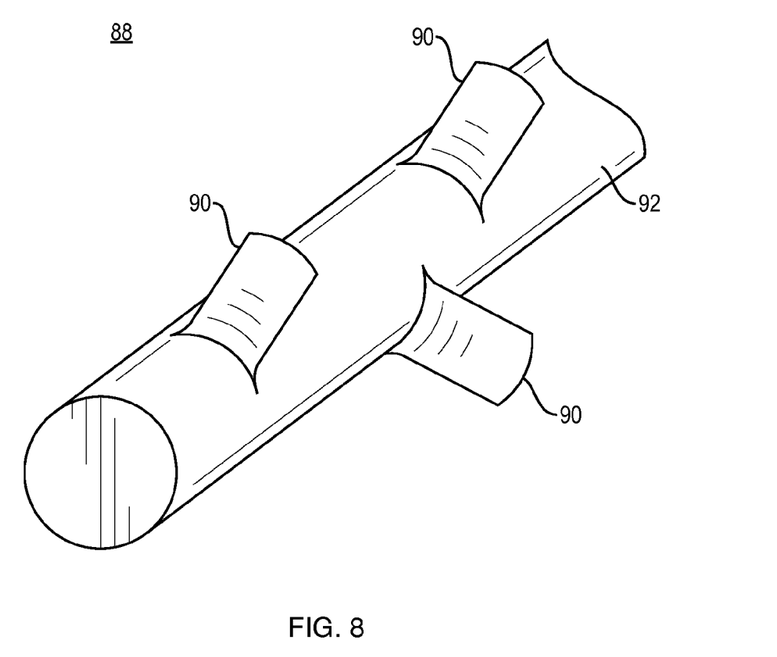
FIG. 8 is a detailed view of a secondary size reduction unit according to one embodiment of the present invention.

A secondary size reduction unit 74, FIG. 8, is mounted at a top or upper portion of the recycler 24 so that the asphalt based product 12 goes directly into the recycler 24, preferably under a free fall under the influence of gravity alone, after passing through the secondary size reduction unit 74. The use of a gravity fed design has the advantage of greatly dissipating heat due to air circulation. As the asphalt based product 12 enters the secondary size reduction unit 74 it is impacted by a machine 88 with a plurality of impact points or "knives" 90 on a rotating shaft 92. The machine 88 is encased within a housing 94. The impact points 90 are much smaller than the teeth 78 on the primary size reduction unit 72 and the secondary size reduction unit 74 runs at a much higher speed than the primary size reduction unit 72, which is preferably approximately 2000 RPMs. This design creates a cutting action (but not impingement) further reducing the asphalt based product 12 to about one inch in diameter.

Figure 2:
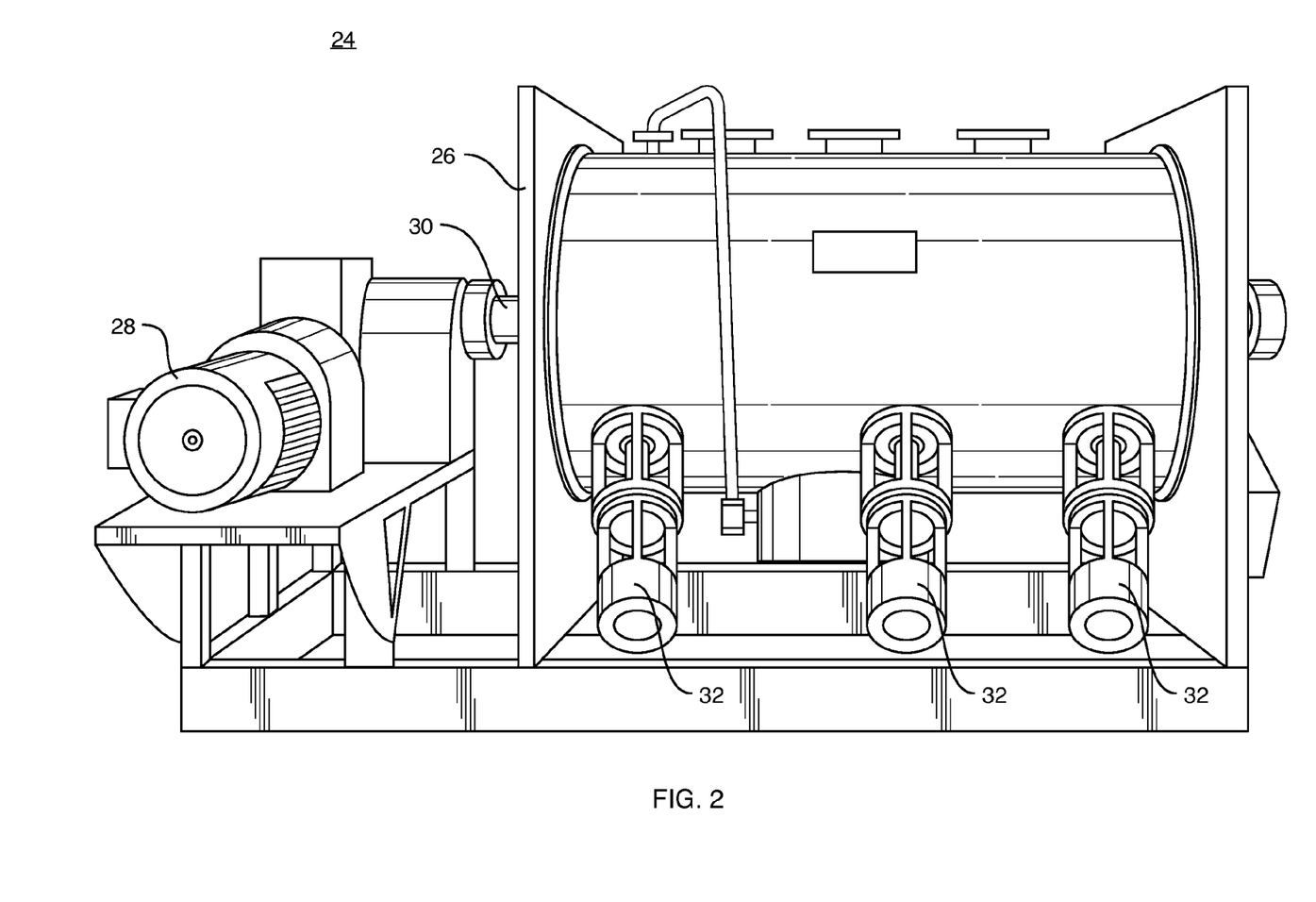
FIG. 2 is a side view of an exemplary mixer apparatus for use in the asphalt recycling system and method according to the preferred embodiment of the present invention.

An exemplary recycler 24 available from H.C. Davis Sons Mfg. is shown in greater detail in FIG. 2 and includes a horizontal mixing and grinding chamber or recycling chamber 26 having a first motor 28 which drives a horizontally displaced mixing blade 50 shown in greater detail in FIG. 4 and having a central rod member 52 from which a number of mixing paddles 54 extend; certain paddles with serrated teeth 56 and other paddles which are smooth edged 58. The mixing paddles 54 may be of various lengths, with some preferably extending very near the interior wall (not shown) of the mixing chamber, to ensure that all material to be recycled within the recycler 24 is picked up, rotated and processed.

Figure 4:
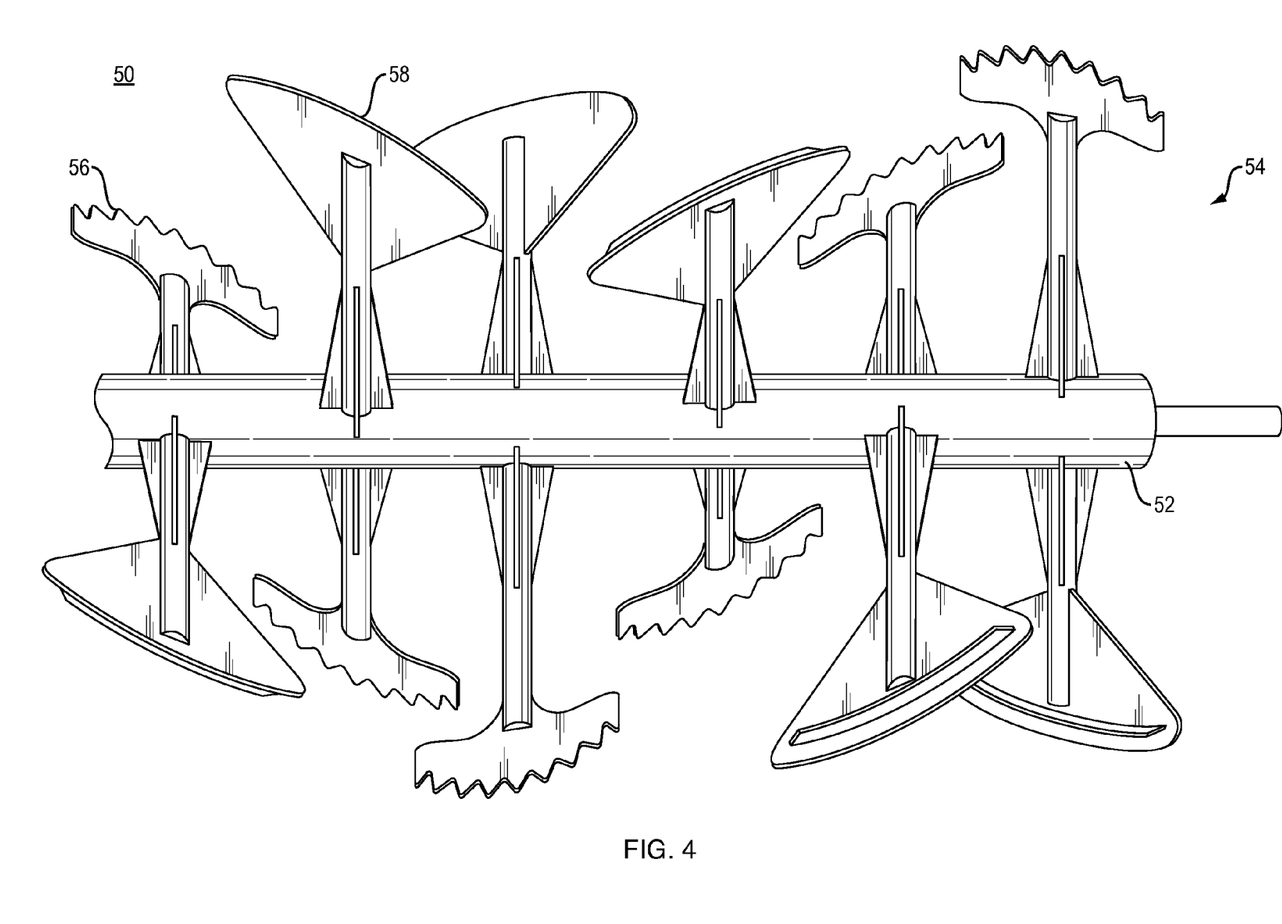
FIG. 4 is a perspective view of a mixing blade used in the mixer in the preferred embodiment of the present invention.

In a preferred embodiment, the mixing paddles 54 are approximately 4-6 inches from the interior wall. The recycler 24 is preferably an almost completely closed vessel, which facilitates the energy efficient addition of dry ice and which contains the talc dust, which is an improvement over hammer mills and hogger style devices, which are open and retain the materials in a chamber for only a few seconds.

Any number of paddles 54 as well as any combination of serrated teeth paddles 58 and smooth edged paddles 58 may be used. For example, there may be 8 paddles, with 4 long paddles and 4 short paddles. The paddles 54 are designed to move the material from an inlet to an outlet of the recycler 24 in a spiral down or "figure 8" manner. The rotation has the effect of further reducing the asphalt based product 12 by abrasion between the interior wall and the paddles 54. The paddles 54 perform a significant grinding action by forcing the granule laden asphalt based product 12 to abrade upon itself.

The paddles 54 are designed to thoroughly mix in any talc, limestone or other fine material or powder with the material to be recycled. The paddles 54 also convey the asphalt based product 12 into the choppers and mix in any dry ice 46. Talc powder is typically added to the recycler 24 to prevent agglomeration and to reduce adhesion, which is necessary for the screening process. The talc material is preferably 200 mesh talc or other material or powder added at a rate of approximately 6-8%. The talc is mixed thoroughly by the paddles 54.

Talc is a good flow agent and it also blinds to the sticky exposed edges of the asphalt material being recycled preventing (or at least reducing) the entire mixture from sticking together. Dry ice may also be added to the mixture to keep the frictional energy of the mixing from the paddles 54 and the choppers 32 from heating up the asphalt mixture causing it to stick together. Problems may develop in the mixer such as asphalt sticking to the walls and/or plugging any screener if the temperature of the mixture gets above 80° F. The lower the temperature the faster the screening can occur.

Figure 3A:
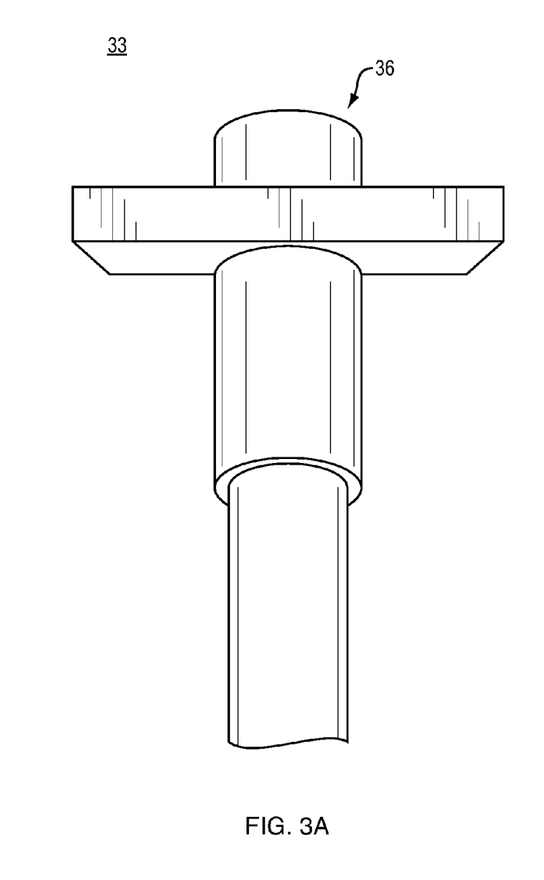
FIGS. 3A-3D are views showing one embodiment of a high-speed chopper impacter head (FIG. 3A), chopper head (FIG. 3B), and drive motor for the impacter and chopper heads (FIGS. 3C and 3D) for use in the exemplary mixer of the asphalt recycling system and method according to the present invention.

One or more impact choppers 32, FIG. 3A, are located within recycler 24 and driven by motor 34. These impact choppers 32 are designed to break off the coating of the asphalt shingles. The impact choppers 32 are blunt, such that they shatter the filled coating portion of the shingle into a "dust". The choppers 32 in the recycler 24 impact the shingles at a speed that will not break the granules or sand particles, but which will break the shingles apart, allowing the granules to be separated and removed. The speed does not destroy the flakes containing the reinforcement (cellulose or fiberglass). The preferred chopper speed is approximately 3000 RPMs. There is no mechanical impingement in this process to break the granules. The choppers 32 thoroughly mix the talc, break the dry ice into particles (facilitating sublimation), and adhere the talc to the asphalt particles due to the impact force. All of these factors condition the asphalt based product 12 for the screening process. The coating portion, also known as the granules or rocks located on the surface of shingles, must be removed for the final product. Users of the final product (shingle manufacturers and hot melt asphalt producers) do not want the fibers, because with roofing products, they were not in the original filled coating and with road products, they are a source of inconsistency (i.e. some cellulose and some fiberglass). The high speed choppers 32 create friction and heat and therefore this process must occur within a cooled environment of the recycler 24. The mixing paddles 54 help convey the shingles and fragments to the choppers 32.

Figure 3B:
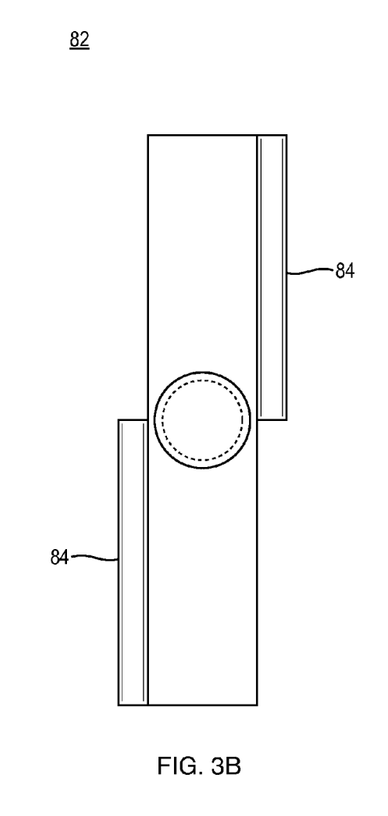
Figure 3C:
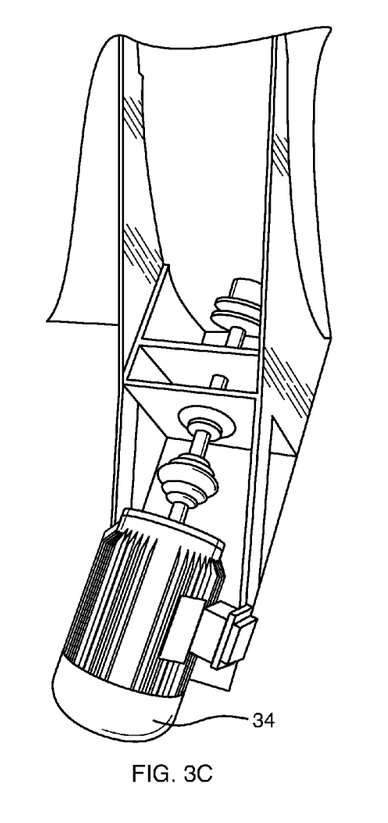
Figure 3D:
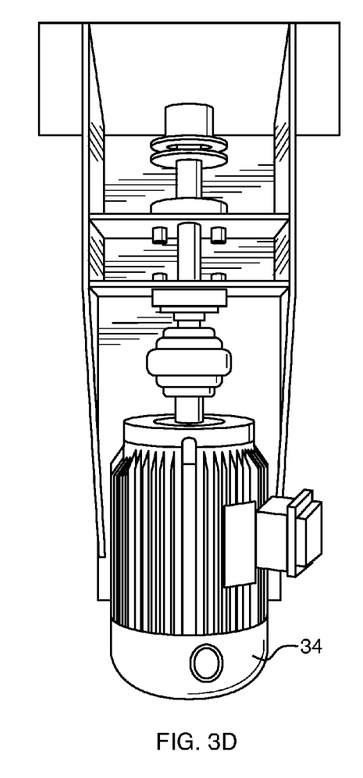

In another embodiment, the asphalt based products 12 are fed into the recycler from above, passing first through a knife chopper 82 FIG. 3B or a blunt rotating hammer chopper 33, FIG. 3A and then into the recycler 24. The use of a gravity fed design enables the choppers 82/33 to work without paddles 54 or cooling (dry ice 46 or jacket coolant 44). In this embodiment, air dissipates the heat generated from the chopping/cutting process saving energy and allowing for a simplified design. In this design, the recycled asphalt pieces now further processed by the choppers and hammer 82/33 as they fall into the recycler 24 are more finely reduced in size the second time around. In particular, the knife chopper 82 serves to cut up any remaining large pieces of asphalt shingles to be recycled while the blunt hammer/impact chopper 33 serves to impact the pieces and for example, dislodge any granules that might be remaining on the asphalt shingles, since granules are not desired and need to be preferably sorted out as completely as possible.

In the preferred embodiment, the recycler 24 is operated in a cool or cooled mode. The recycling chamber 26 features a jacket coolant 44, wherein the recycling chamber 26 is jacketed and 30° cooled glycol cooling liquid is circulated around the jacket 44 and serves to cool the recycling chamber 26. In addition and importantly, dry ice 46 is preferably added to the recycling chamber 26 along with the asphalt based product 12 12 to be recycled. The dry ice 46 serves to drive out any moisture in the material to be recycled and most importantly, keeps the frictional energy of the mixing from heating up the asphalt and makes the material very brittle thus facilitating breaking down the shingle waste by the high-speed choppers and the mixing blade of a horizontal mixer system. Asphalt becomes brittle and shatters at about 35° F., whereas hogger type systems must use brute force to shred the shingles. Problems develop in the recycler 24 (asphalt sticking to the walls) and the sorter 42 (plugging of screens with asphalt) when the temperature rises above 80° F. The lower the temperature of the material, the faster the screening process can occur.

The present invention may feature either of the cooling methods alone or in combination with one another. When using a blend of materials in the recycler, approximately 50 pounds of dry ice per ton of material being recycled is preferably utilized. Although dry ice 46 and a jacket coolant 44 are preferable, other cooling methods, such as liquid nitrogen, are contemplated and within the scope of the present invention.

The material recycling system 10 has the ability to recycle manufacturer's asphalt roofing shingle waste, post consumer asphalt shingle waste, or a combination of the two products. In a preferred embodiment of the present invention, a mix or blend of both manufacturers' asphalt roofing shingle waste and post consumer asphalt shingle waste is used in the system. The blend provides a superior end product, which is easier to handle and more favorable for creation of new asphalt products. If only manufacturer's asphalt roofing shingle waste is used, the asphalt based product 12 is too pliable and in turn needs to be cooled in order to make the material more brittle. This cooling process requires both the jacket coolant 44 and dry ice 46. If only post consumer asphalt shingle waste is used, the asphalt based product 12 does not need as much cooling and generally dry ice 46 is not necessary and the jacket coolant 44 is sufficient.

Alternatively, the recycler 24 may be operated in a hot or heated mode. In this heated mode, asphalt, oil, wax, polymer or other material may be added to make a slurry suitable to be added to an attritor. The plenum 14 feeding the material conditioner 16 may include choppers or grinders to initially condition or shred the material being input into the recycler 24. The teeth and half plows of the horizontal mixer system keep the unit from jamming even if the bundles are put in whole. The differing distance from the vessel walls along the alternation of serration and plows allows the design to function properly.

Because it is contemplated that the system of the present invention will be operated in batch mode, the recycler 24 will be operated with a predetermined amount of shingle waste material for a predetermined amount of time to achieve a recycled product having the desired coarseness or fineness. The dry ice 46 will evaporate as a gas.

A final processing step may include the application of talc, limestone, or other fine material to the end product to coat each piece, making the end product less sticky. When using only post consumer asphalt shingle waste, 0-50 pounds per ton of fine material is used. When using only manufacturer's asphalt roofing shingle waste, 100+ pounds per ton of fine material is used. When using the preferred blend of the two materials, 50-100 pounds per ton of fine material is used.

The processed or recycled material, now in the form of granules, asphalt powder (filled coating) and flakes will be removed from the recycler mechanism 24 as shown generally at 40, FIG. 1 and be provided to a primary sorter or screener 42. The primary sorter 42 serves to separate the recycled asphalt powder using a screen or other similar sorting mechanism. The process is designed to separate the particles into the original raw material distribution. This allows the granules (11-16 mesh) to remain intact, while the filler and asphalt "filled coating" (50-250 mesh) is separated out. The flakes are preferably separated from the granules in a secondary sorter 96 using a ¼ inch mesh screen. The secondary sorter 96 is an additional sorting step for the asphalt based product 12, which may occur after the asphalt based product 12 has passed through the primary sorter 42.

In the preferred embodiment, the primary separation from the process is at 30-60 mesh, which allows for separation between the bottom mesh size of the surface granule specification and the top mesh size of the filler specification. This preferred separation is also the ideal size for using the recycled material in the manufacturing other asphalt based products, such as road crack filler, roof cements and roof coatings. As an example, the 200 mesh material can be reused by the asphalt roofing industry because the 200 mesh size complies with the current specification and manufacturing process.

Figure 5:
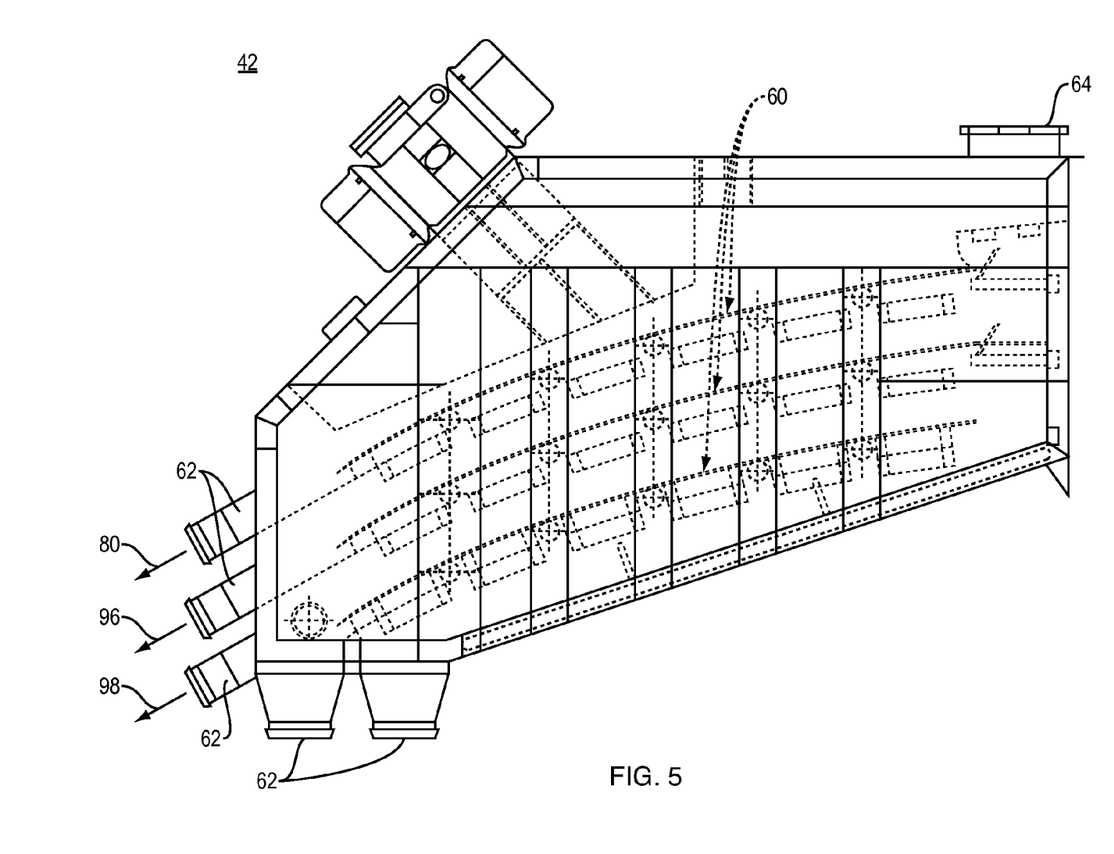
FIG. 5 is a detailed view of a sorter/screener according to one embodiment of the present invention.

In a preferred embodiment of the present invention, the primary sorter 42 is a multi-vibe high frequency ball screener, FIG. 5, such as one manufactured by Midwestern Industries, Inc in Massillion, Ohio, which screens the end product particles accurately and efficiently. The primary screener 42 may be approximately 10 feet by 5 feet. The primary screener features a plurality of levels 60 and a plurality of discharge chutes 62. Each level 60 features a screen 66, FIG. 6. Large particles are maintained on the uppermost level and each subsequent level uses a decreasing screen size to further screen various particle sizes, with the finest particles falling to the lowermost level. The lowermost level will not feature a screen. The primary screener 42 features a sloped design for each level 60, thereby allowing the asphalt based product 12 to travel from the material distributor 64 downward toward the discharge chutes 62. The material distributor 64 enables the asphalt based product 12 to be dispersed evenly across the entire screening surface of the uppermost level, ensuring maximum screening efficiency. The discharge chutes 62 of various levels 60 can be combined, thereby allowing a user to customize the asphalt based product 12 leaving the screener 42. For example, a user can adjust the discharge chutes 62 to combine two or more discharge chutes 62 together.

Figure 6:
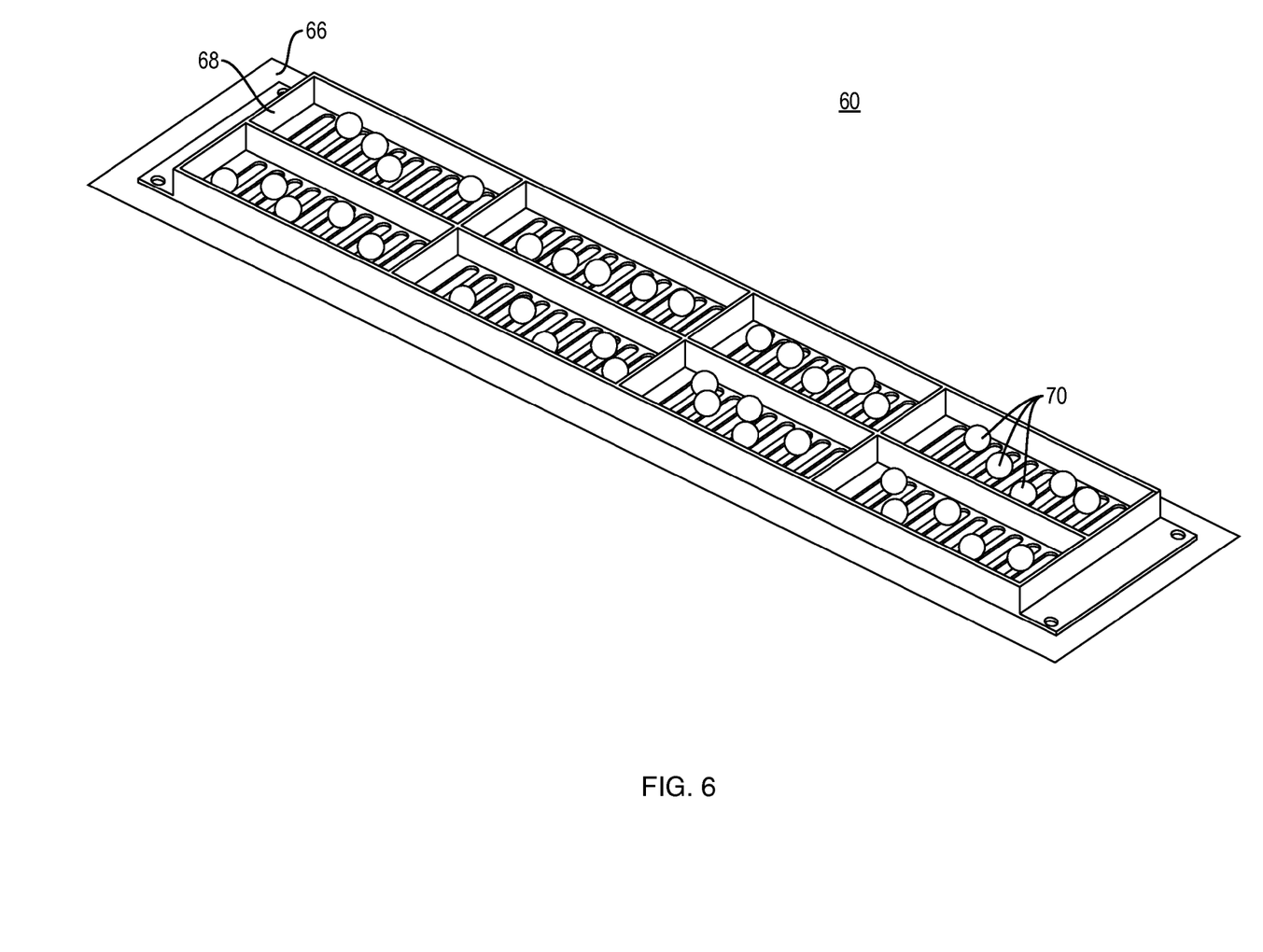
FIG. 6 is a detailed view of a level of a sorter according to one embodiment of the present invention.

Each level 60 of the primary screener 42 (except the lowermost level) features a screen 66. The screen 66 covers a tray 68, located below the screen 66. The tray 68 may be broken into various compartments as shown in FIG. 6. The tray 68 features a plurality of balls 70. The balls are large enough that they cannot pass downward through the tray or upward through the screen. As the primary screener 42 vibrates, vibration causes the balls 70 to bounce up into the screen 66 above them, knocking the asphalt based product 12 around. The motion of the balls 70 against the screen 66 prevents asphalt, filler, and other particles from lodging in and clogging the screen 66, thereby keeping the screen 66 clean and keeping the asphalt based product 12 moving throughout the primary screener 42. The balls 70 may also serve to breakdown any asphalt clumps that are caught in the screen 66. The balls 70 are preferably made from a rubber or other composite material.

The system 10 may further include the use of an air separation device 98. The air separation device 98 is designed to remove sand and granules from a 40 mesh screen output of the primary sorter 42.

In a further embodiment of the present invention, all "large" particles of the asphalt based product 12, which cannot pass through the uppermost level screen of the primary screener 42 are sent back to the recycler 24 for a second processing trip 80 through the recycler 24. In this second processing trip 80, the larger materials of the asphalt based product 12 are fed into the top of recycler 24, above the process material level of the recycler 24, with a gravity feed. Positioning the chopper so that it directly feeds into the recycler 24 has the advantage of immediate exposure to talc. The chopper opens up new un-talced asphalt sites that would cause sticking unless they were immediately re-talced. The gravity feed allows the asphalt based product 12 to establish a free fall. The asphalt based product 12 then passes through a rotating cutter or return line chopper 82 with horizontal blade rotation located at the top of the recycler. The cutter is preferably maintained within a housing (not shown) so that a secondary impact occurs. The cutter 82 is preferably a knife chopper, FIG. 3B. The cutter 82 features one or more knife edges 84. The knife edges 84 are preferably hardened metal and are of the same or similar construction as the knives used to die cut shingles when they are manufactured. The second processing trip 80 may optionally include a magnet 38, located prior to the cutter 82, to remove any lingering nails or other debris. The chopper and shaft are in a box that is opened at the top to let asphalt based product 12 in and open at the bottom to let asphalt based product 12 out. The sides of the box are at a right angle to the horizontal chopper motion positioned such that the choppers impact the material and accelerate it against the vertical box sides creating a secondary impact.

The recycled asphalt material provided by the processing of the present invention dissolves instantly in standard equipment because it is available as a 35-50 mesh powder and it also coats the granules. This beneficial coating occurs when the shingles are produced. The hot mix process consists of heating the asphalt and aggregate separately then mixing them in a pug mill. The pug mill wets out or completely coats the aggregate with asphalt. The asphalt combines the aggregate together like a glue to form the road. This process fully exploits the entrained mix energy and solves the problems that have been observed with attempts to recycle post factory and post consumer shingles. In shingle production, the limestone filler is heated to 400° F. and the asphalt to 450° F. such that the viscosity of the asphalt is reduced sufficiently to get the tremendous surface area of the particles coated. The mixing process is also done in a pug mill.

The industry currently uses ⅜ inch chips and these ⅜ chips will not dissolve in the mixing process, which has caused a major issue in the recycling process. The ⅜ chips have caused a major issue with consistency because the chips are made in a "hogging" process. A massive amount of horsepower is required to rip the shingles to the required size. The shingles are inconsistent as they age and due to the removal from the roof, the hogger process adds to the problem. No attempt can be made to control either the particle size or the percentage of asphalt. Therefore, the new process allows for either solids or asphalts to be readily added back, such that the product will be consistent.

The currently used hogger process uses magnets to remove nails, with only about a 90 percent success rate on ferrous nails and very little success rate with aluminum nails. In order to remove all of the nails to ensure nails are not present in the final material, a two step process is used. The new two step process uses a screen in combination with air classification. This dual process assures that no nails will pass into the final product. Either air or screens also easily separate out the plastic film. It is also important to create an end product that can create a pavement that has minimal voids and air pockets in order to ensure superior quality. The new process easily allows for the percentage of fines to be reduced to at least 12 percent. For example, if the granular product contains 20 percent fines, then in a paving mix 67 percent more reclaim can be used. This benefit is combined along with the 10 percent less virgin asphalt that is required for the paving mix.

The combination of air and screens also serves to separate out the saturated felt fraction. In organic shingles, the saturated felt fraction accounts for 18 percent of the raw material mix. The material is composed of 37 percent asphalt and 63 percent cellulose fibers. The asphalt is mildly oxidized to a melt point of 150 F retaining more of the oil content (other asphalt is oxidized to 235 F) and is not mixed with filler. This asphalt is located in the center of the shingle and has not been degraded by UV exposure. This saturating asphalt is the most valuable component in the shingle and it is inseparable from the cellulose fiber, but this is a positive in applications that require cellulose and asphalt such as roof cements. This fraction of the shingle also has the ability to be stored with only mild agitation. This can be contrasted with "filled coating" with requires significant agitation to keep the dense filler in solution. The saturated felt segment can be stored in the tanks normally used by the paving industry. The saturated felt fraction can also be combusted in oil burning equipment if it is mixed with standard oil and the resulting cellulose becomes a valuable source of energy.

In a preferred embodiment, the method creates approximately 53 percent asphalt coated granules, 40 percent filled coating or asphalt powder and 17 percent flakes. For example, when incorporating surfacing granules into hot mix asphalt, shingles are currently chipped into 3/8 pieces and added to road mix. As compared to 3/8 inch chips both the granular portion and the filled coating asphalt powder fraction can be successfully incorporated into HMA. This occurs because the granules are coated with filled coating and the filled coating (as a separate fraction) is in a powdered form, so both readily go into solution in the typical HMA mixing procedure. The 3/8 chips are too large with the filled coating and is buffered by both granules and sand and the glass mat tenaciously holds the chips together. Consequently, the filled coating portion cannot be incorporated into the road mix. The entrained mix energy is also lost with 3/8 inch chips because the asphalt does not go into solution. Therefore, by removing the fiberglass reinforced flakes (or in the case of the older shingles where the flakes are reinforced with cellulose fiber) the major source of raw material inconsistency is removed. The chips may contain either fiberglass or cellulose reinforcement or a mixture. Presorting by shingle type is not done because an individual house may have both types of shingles in different layers. The present method isolates the filled coating portion which is same in both types of products. These "flakes" are very difficult to breakdown because of the reinforcement. However, they can be ground and liquefied using a hot process. It is contemplated and within the scope of the current invention, that the portion which cannot be recycled can be reclaimed using an attritor, whereby the portion can be used in crack filler.

Granules that fall into the 11-50 mesh particle distribution size have been carefully selected by the roofing industry because every void on a roof surface must be filled. A major purpose of granules is to protect the asphalt from UV degradation. The granules are designed for packing and have a very low void volume. These properties make the particles ideal for use in Hot Mix asphalt and cold patch used to repair pot holes. A cold patch product can be made from post factory granules and powder with an addition of RAP (reprocessed asphalt pavement). The mix works because the asphalt is in a powder form or as a coating on the granules and therefore bonds readily.

Particles of a predetermined and appropriate size may be provided to be used in an asphalt mixture for roadways while other particles of another appropriate size may be provided to be reused in making asphalt shingles. Other uses for the recycled asphalt particles are contemplated as well. The recycled asphalt particles may include granular material, which is often placed on top of roofing shingles. The recycled asphalt shingle waste particles may be stored and provided in powder form or alternatively, could be pressed into bricks or briquettes for multiple uses and for ease of storage and shipping.

One of the products that may be produced using the output of the process and method of the present invention are boards. These boards include, in one embodiment, a layer of fiberglass mat on the top and bottom surface with the ground shingles in the center. These boards have a preferred thickness of 1/4". This makes a rigid product that has many uses including recover boards, sheathing boards and sound transmission reduction boards.

Recover boards are boards that go in between an old commercial low sloped roof and a new roof. The older roof is left in place. Although recover boards are presently available, the asphalt portion is comprised of virgin asphalt and filler, usually limestone. In accordance with the present invention, the grinding process frees up the fiberglass or other organic fibers, which become reinforcements in the new board. Tall oil may be added and which has a very positive function in the product. It is a natural glue that makes the board much stronger than other prior art products. This is important because the board is the foundation for a new roof. The board is mechanically fastened through the old roof and into the roof deck. The new roof is essentially glued to the top surface of the recover board. Boards can typically be made with one half to two thirds less Tall oil then flux asphalt. Either of these materials is a fuel so less is better.

Another product that can be made from the present invention is sheathing. Commercial buildings usually have a layer of special gypsum board beneath the metal, brick or concrete exterior. The main feature of this product is that it again passes a class A fire rating.

Yet another product that can be made from the present invention is sound board. Asphalt has been proven to exhibit substantial sound transmission reduction properties. Again, a class A fire rating is essential. This product may be used beneath a layer of gypsum on the interior walls of a building.

The present invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the allowed claims and their legal equivalents.

The invention claimed is:

1. A system for asphalt recycling, comprising:
an asphalt material recycler, configured for receiving asphalt material to be recycled, said asphalt material recycler having a recycling chamber, at least one motor and one or more choppers, coupled to said at least one motor and located in said recycling chamber, said one or more choppers impacting said asphalt material to be recycled without mechanical impingement such that granules are removed from said asphalt material and not broken, wherein said asphalt material recycler includes one or more of the following cooling processes selected from the group of cooling processes consisting of: dry ice, a jacket coolant and liquid nitrogen; and
a vibrating screener, coupled to said asphalt material recycler, and configured for receiving recycled asphalt material from said recycling chamber, said screener including a tray located below a mesh surface, said tray configured to hold a plurality of balls, wherein said balls are configured to bounce at least partially upwardly against each said respective mesh surface when said vibrating screener vibrates during operation, said vibrating screener configured for providing at least one size of recycled asphalt output material.

2. The system of claim 1, wherein said screener includes a plurality of screen levels, wherein each of said plurality of screen levels includes a mesh surface, wherein each of said plurality of screen levels is configured for providing one size of recycled asphalt output material.

3. The system of claim 2, wherein each of said mesh surfaces has a mesh size which differs from a mesh size of at least one other of said plurality of screen levels, each screen level arranged in a sloping configuration from back to front.

4. The system of claim 1, wherein the vibrating screener allows for separation of said recycled asphalt output material at between 30-60 mesh.

5. The system of claim 1, further including a hopper, configured for receiving asphalt material to be recycled, said hopper coupled to a material conditioner, wherein the material conditioner is located between said hopper and said asphalt material recycler, wherein said material conditioner includes a belt with one or more teeth configured to tear apart and separate said asphalt material to be recycled and one or more hooks configured to force said asphalt material to be recycled through said teeth.

6. The system of claim 1, wherein said screener includes an uppermost level with an uppermost level screen and wherein all asphalt material to be recycled that does not pass through said uppermost level screen of said uppermost level exits said screener and is sent to and re-enters said asphalt material recycler.

7. The system of claim 1, wherein a fine powder is added to said asphalt material recycler, wherein said fine powder is selected from the group consisting of talc and limestone, wherein said fine powder is pressured into said asphalt material by said choppers.

8. The system of claim 1, wherein the cooling processes includes dry ice and wherein said dry ice is broken down by said choppers, wherein sublimation of said dry ice both cools and dries the asphalt material within the recycler.

9. The system of claim 1, wherein the one or more choppers each include a motor that operates one or more blunt hammer style chopper heads or knives that serve to break up the asphalt material within the recycling chamber.

10. The system of claim 1, further comprising a sorting belt, coupled to the asphalt material recycler, wherein the sorting belt allows for human or mechanical removal of unwanted debris from the asphalt material to be recycled prior to the asphalt material being inserted into the asphalt material recycler.

11. The system of claim 1, wherein the asphalt material to be recycled is selected from the group consisting of roofing shingle, tar paper, roll roofing, modified roll roofing, built up roofing and other granular or non-granular asphalt coated material.

12. The system of claim 1, wherein said recycled asphalt output material of the vibrating screener is configured to be used in new asphalt products such as roofing shingles, self-adhesive underlayment membranes or asphalt paving compositions.

* * * * *